(12) United States Patent
Staedter

(10) Patent No.: US 12,545,575 B2
(45) Date of Patent: Feb. 10, 2026

(54) CONTINUOUS THERMAL COMPRESSION OF HYDROGEN

(71) Applicant: ExxonMobil Technology and Engineering Company, Spring, TX (US)

(72) Inventor: Marcel Staedter, Houston, TX (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 477 days.

(21) Appl. No.: 18/006,221

(22) PCT Filed: May 26, 2021

(86) PCT No.: PCT/US2021/070608
§ 371 (c)(1),
(2) Date: Jan. 20, 2023

(87) PCT Pub. No.: WO2022/026967
PCT Pub. Date: Feb. 3, 2022

(65) Prior Publication Data
US 2023/0202836 A1 Jun. 29, 2023

Related U.S. Application Data

(60) Provisional application No. 63/057,524, filed on Jul. 28, 2020.

(51) Int. Cl.
*C01B 3/00* (2006.01)
*C01B 3/0073* (2026.01)
(52) U.S. Cl.
CPC ................. *C01B 3/0073* (2013.01)

(58) Field of Classification Search
None
See application file for complete search history.

(56) References Cited

U.S. PATENT DOCUMENTS 4,178,987 A 12/1979 Bowman et al.
4,212,726 A * 7/1980 Mayes ............... C01B 3/52
208/65

(Continued)

FOREIGN PATENT DOCUMENTS

CN 102530860 B 3/2014
CN 106050480 B 9/2018

(Continued)

*Primary Examiner* — John J Figueroa
(74) *Attorney, Agent, or Firm* — Vorys, Sater, Seymour and Pease LLP

(57) ABSTRACT

A continuous thermal hydrogen compression system, and methods of thermally compressing hydrogen, are disclosed. A hydrogenation module accepts a hydrogen gas stream to be absorbed or adsorbed to a lean carrier stream through heat removal, thereby producing a heat output and a rich carrier stream containing absorbed or adsorbed hydrogen. A pump, connected to an output of the hydrogenation module, increases the pressure of the rich carrier stream to produce a pressurized rich carrier stream. A dehydrogenation module separates, via an addition of heat, a pressurized hydrogen gas stream from the pressurized rich carrier stream to produce a lean carrier stream. A pressure reducing device reduces the pressure of the lean carrier stream before it is returned to the hydrogenation module. The carrier stream is cycled continuously between the hydrogenation module and the dehydrogenation module.

9 Claims, 7 Drawing Sheets

(56) References Cited

U.S. PATENT DOCUMENTS

| | | | |
|---|---|---|---|
| 5,414,168 A * | 5/1995 | Scott | C07C 5/333 |
| | | | 208/103 |
| 6,672,078 B2 | 1/2004 | Ovshinsky et al. | |
| 8,114,363 B1 * | 2/2012 | Golben | C10L 3/08 |
| | | | 422/600 |
| 8,394,174 B2 * | 3/2013 | Chen | C01B 3/56 |
| | | | 95/55 |
| 8,469,676 B2 | 6/2013 | Sutherland | |
| 2004/0042957 A1 | 3/2004 | Martin | |
| 2012/0118010 A1 * | 5/2012 | Forsyth | B01D 53/002 |
| | | | 62/617 |
| 2022/0316074 A1 * | 10/2022 | Gehrold | B01D 53/26 |

FOREIGN PATENT DOCUMENTS

| | | | |
|---|---|---|---|
| TW | I645608 | 12/2018 | |
| WO | 2010087723 | 8/2010 | |
| WO | WO-2021073975 A1 * | 4/2021 | C25B 15/087 |

* cited by examiner

CONTINUOUS THERMAL COMPRESSION OF HYDROGEN

CROSS REFERENCE TO RELATED APPLICATION

This application is a U.S. National Stage entry under 35 U.S.C. 371 of International Application No. PCT/US2021/070608, that published as WO2022/026967, and was filed on 26 May 2021, which claims the priority benefit of U.S. Provisional Patent Application No. 63/057,524 filed Jul. 28, 2020, entitled CONTINUOUS THERMAL COMPRESSION OF HYDROGEN.

FIELD OF THE INVENTION

The invention relates to methods and systems for hydrogen compression, and more specifically, to the compression of hydrogen using thermal and mechanical means.

BACKGROUND

Hydrogen has tremendous potential as an energy source. It is the most abundant element on earth and can deliver or store a large amount of energy. When used in a fuel cell, it produces only electricity, power, and heat—thereby making it a clean fuel as well. Even when used in more traditional combustion-type reactions, such as in a vehicle engine, hydrogen produces no direct pollution. Consequently, there is a great deal of interest in determining how to most efficiently and economically generate, store, and use hydrogen as a fuel.

One challenge of using hydrogen is that it has a very low density at atmospheric pressure. Typically hydrogen gas is compressed in a fuel container to increase the mass of gas the fuel container can hold. Hydrogen compression is also needed for pipeline transport and for end use compression after dehydrogenation from a carrier material. However, the power required to compress a gas is inversely proportional to the density of the gas. As an example, the densities of hydrogen and methane are 0.09 kg/m$^3$ and 0.71 kg/m$^3$, respectively at standard temperature and pressure. Considering the compression power with respect to the heating value of the gas (120 MJ/kg and 50 MJ/kg for hydrogen and methane, respectively), the power requirement per unit of energy delivered by the compressor is roughly 3.3 times greater for hydrogen than for methane. Moreover, target pressures for known hydrogen uses are significantly greater than pressures that may be found in a typical natural gas pipeline; for on-board vehicle fuel storage, for example, may have compression requirements of up to 70 MPa (700 bar). Thus, compression power is a significant parasitic cost of a hydrogen economy infrastructure that involves mechanical compression of hydrogen. Therefore, reduction of power requirements for hydrogen compression will facilitate the development of a hydrogen economy.

One method of reducing hydrogen compression power requirements is to note that specific pumping power requirements for liquids are only marginal compared to vapor compression for the same pressure rise due to significantly greater liquid densities (~3 orders of magnitude) and incompressible fluid characteristics. Additionally, mechanical energy required to drive compressors (and pumps) is high grade in nature; in other words, the energy required for mechanically driven pumps or compressors is characterized by energy streams with a high exergy content. Using a lower grade energy such as a low/medium temperature heat provides potential to reduce the high grade energy demand. With respect to hydrogen compression, absorption or adsorption of hydrogen gas into a liquid or pseudo-liquid hydrogen carrier (HC) that can be pumped with virtually incompressible behavior, allows for hydrogen pressurization with much lower high grade energy requirements. However, the overall energy requirement must be achieved with thermal energy input. That is, dehydrogenation of the carrier requires a heat input to produce a pure hydrogen gas stream. But this heat input can be provided at lower grade, i.e., lower exergy content energy stream (waste heat for example). Therefore, this approach enables the optimization of the hydrogen compression system. Additionally, reducing rotating equipment to a relatively small pump provides reliability and maintenance benefits. Further, reducing or eliminating mechanical compression reduces other problems typically associated with mechanical systems, such as sealing problems and contamination of lubricants with hydrogen.

China patent CN102530860B discloses thermal compression of hydrogen according to known principles, in which a cyclic adsorption approach is used. The cyclic adsorption employs stationary beds of a sorbent that are switched out-of-phase to perform adsorption and desorption in an alternating pattern. However, none of the known methods of thermal compression provide truly continuous thermal hydrogen compression. What is needed, therefore, is a method to hydrogenate and dehydrogenate hydrogen in a continuous manner and in a way that the flow rate of the resulting high-pressure hydrogen stream can be easily modified.

SUMMARY OF THE INVENTION

According to disclosed aspects, a continuous thermal hydrogen compression system is provided. A hydrogenation module accepts a hydrogen gas stream at a first pressure to be absorbed or adsorbed to a lean carrier stream through heat removal, thereby producing a heat output and a rich carrier stream containing absorbed or adsorbed hydrogen. A pump, connected to an output of the hydrogenation module, increases the pressure of the rich carrier stream to produce a pressurized rich carrier stream. A dehydrogenation module separates, via an addition of heat, a pressurized hydrogen gas stream from the pressurized rich carrier stream to produce a lean carrier stream. A pressure reducing device reduces the pressure of the lean carrier stream before it is returned to the hydrogenation module. The carrier stream is cycled continuously between the hydrogenation module and the dehydrogenation module.

According to other disclosed aspects, a method of continuously compressing a hydrogen gas stream is disclosed. The hydrogen gas stream is adsorbed or absorbed in a hydrogenation module, at a first pressure level, to a lean carrier stream through heat removal. A heat output and a rich carrier stream containing absorbed or adsorbed hydrogen are produced. Using a pump, a pressure of the rich carrier stream is increased to produce a pressurized rich carrier stream. A pressurized hydrogen gas stream is separated from the pressurized rich carrier stream in a dehydrogenation module via an addition of heat, thereby producing a lean carrier stream. The pressure of the lean carrier stream is reduced before the lean carrier stream is returned to the hydrogenation module. The carrier stream is cycled continuously between the hydrogenation module and the dehydrogenation module.

According to still other aspects of the disclosure, a multi-stage thermal hydrogen compression system is disclosed. The system includes N thermal compression stages, where N is an integer equal to or greater than 2. Each of the N thermal compression stages includes: a carrier stream; a hydrogenation module configured to accept a hydrogen gas stream at a first pressure to be absorbed or adsorbed to a lean carrier stream through heat removal, thereby producing a heat output and a rich carrier stream containing absorbed or adsorbed hydrogen; a pump connected to an output of the hydrogenation module and configured to increase a pressure of the rich carrier stream to produce a pressurized rich carrier stream; a dehydrogenation module configured to separate, via an addition of heat, a pressurized hydrogen gas stream from the pressurized rich carrier stream to produce a lean carrier stream; and a pressure reducing device configured to reduce a pressure of the lean carrier stream before the lean carrier stream is returned to the hydrogenation module. The carrier stream is cycled continuously between the hydrogenation module and the dehydrogenation module. The pressurized hydrogen gas stream of a first thermal compression stage through an N–$1^{st}$ thermal compression stage comprises the hydrogen gas stream of a second thermal compression stage through an $N^{st}$ thermal compression stages, respectively.

According to other aspects, a method of continuously compressing hydrogen is disclosed. A compression system is provided having N thermal compression stages, where N is an integer equal to or greater than 2. Each of the N thermal compression stages includes: a carrier stream; a hydrogenation module that accepts a hydrogen gas stream at a first pressure to be absorbed or adsorbed to a lean carrier stream through heat removal, thereby producing a heat output and a rich carrier stream containing absorbed or adsorbed hydrogen; a pump connected to an output of the hydrogenation module, the pump increasing a pressure of the rich carrier stream, thereby producing a pressurized rich carrier stream; a dehydrogenation module that separates, via an addition of heat, a pressurized hydrogen gas stream from the pressurized rich carrier stream, thereby producing a lean carrier stream; and a pressure reducing device that reduces a pressure of the lean carrier stream before the lean carrier stream is returned to the hydrogenation module. The carrier stream is cycled continuously between the hydrogenation module and the dehydrogenation module. The pressurized hydrogen gas stream of a first thermal compression stage through an N–$1^{st}$ thermal compression stage comprises the hydrogen gas stream of a second thermal compression stage through an $N^{st}$ thermal compression stages, respectively.

DETAILED DESCRIPTION

Figure 1:
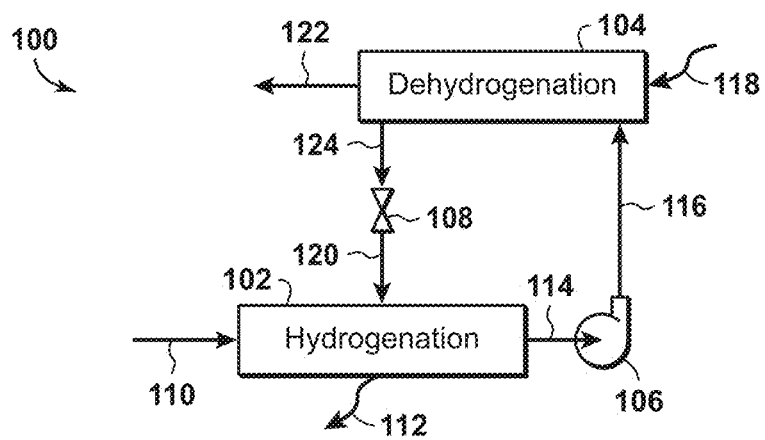
FIG. 1 is a schematic diagram of a thermal hydrogen compressor according to disclosed aspects.

Various specific aspects, embodiments, and versions will now be described, including definitions adopted herein. Those skilled in the art will appreciate that such aspects, embodiments, and versions are exemplary only, and that the invention can be practiced in other ways. Any reference to the "disclosure" may refer to one or more, but not necessarily all, of the disclosed aspects defined by the claims. The use of headings is for purposes of convenience only and does not limit the scope of the disclosure. For purposes of clarity and brevity, similar reference numbers in the several Figures represent similar items, steps, or structures and may not be described in detail in every Figure.

All numerical values within the detailed description and the claims herein are modified by "about" or "approximately" the indicated value, and take into account experimental error and variations that would be expected by a person having ordinary skill in the art.

As used herein, "ambient temperature" refers to the temperature of the environment in which any physical or chemical event occurs, unless otherwise specified. The term "at" or "near" "ambient temperature" as used herein refers to the temperature of the environment in which any physical or chemical event occurs plus or minus ten degrees, alternatively, five degrees, alternatively, three degrees, alternatively two degrees, and alternatively, one degree, unless otherwise specified. A typical range of ambient temperatures is between about 0° C. (32° F.) and about 40° C. (104° F.), though ambient temperatures could include temperatures that are higher or lower than this range.

As used herein, a "catalyst" is a material which under certain conditions of temperature or pressure increases the rate of specific chemical reactions. A catalyst may also be a material that performs as a physisorbent or chemisorbent for specific components of the feed stream.

As used herein, "compressor" includes any type of equipment designed to increase the pressure of a material, and includes any one type or combination of similar or different types of compression equipment. A compressor may also include auxiliary equipment associated with the compressor, such as motors, and drive systems, among others. The compressor may use one or more compression stages, for example, in series. Illustrative compressors may include, but are not limited to, positive displacement types, such as reciprocating and rotary compressors for example, and dynamic types, such as centrifugal and axial flow compressors, for example.

As used herein, "dehydrogenation" refers to any process of removing one or more hydrogen atoms or molecules from another atom or molecule.

As used herein, "fluid" refers to gases, liquids, and combinations of gases and liquids, as well as to combinations of gases and solids, and combinations of liquids and solids.

As used herein, "heat exchanger" refers to any device or system configured to transfer heat energy or cold energy between at least two distinct fluids. Exemplary heat exchanger types include a co-current or counter-current heat exchanger, an indirect heat exchanger (e.g. a spiral wound heat exchanger or a plate-fin heat exchanger such as a brazed aluminum plate fin type), direct contact heat exchanger, shell- and-tube heat exchanger, and any combination thereof.

As used herein, "hydrogenation" refers to any process of adding one or more hydrogen atoms or molecules to another atom or molecule.

As used herein, "liquid" refers to a substance or mixture of substances in a liquid state. A liquid may include a minor amount of gases and/or dissolved/precipitated solids.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

All patents, test procedures, and other documents cited in this application are fully incorporated by reference to the extent such disclosure is not inconsistent with this application and for all jurisdictions in which such incorporation is permitted.

The disclosed aspects provide a thermal hydrogen compressor in which the stationary sorbent beds of known technologies are replaced with a closed loop sorbent flow circuit, thereby providing a continuous stream of compressed hydrogen. This enables greater flexibility, facilitates the integration of storage and provides high integration potential within a liquid fuels infrastructure.

FIG. 1 depicts a thermal hydrogen compression system 100 according to disclosed aspects. System 100 includes a hydrogenation module 102 and a dehydrogenation module 104. System 100 also includes a pump 106 and a throttling valve 108. A hydrogen carrier 120 flows cyclically between the hydrogenation module 102 and the dehydrogenation module 104. The hydrogen carrier is a substance that exhibits substantially incompressible behavior and liquid flow behavior. The hydrogen carrier may be a liquid stream or a slurry. Alternatively, the hydrogen carrier may comprise a stream of fine solid particles that can be pumped and/or compressed, similar to a liquid. The hydrogen carrier may comprise liquid organic hydrogen carriers designed to exhibit favorable hydrogen vapor pressure vs temperature characteristics. The hydrogen carrier may comprise ionic liquids, hydride slurries, an adsorbent particle stream, or any other substance that is substantially incompressible and flows similar to a liquid. The hydrogen carrier may be characterized by a hydrogen density (by weight), and desorption and adsorption/absorption/chemical bonding pressures at the respective dehydrogenation and hydrogenation temperatures or temperature ranges.

A low pressure hydrogen feed 110 enters the hydrogenation module 102 and is adsorbed, absorbed, or chemically bonded by or to a hydrogen carrier in an exothermic reaction at a low pressure and a low temperature. This exothermic reaction requires heat rejection, represented at 112, at a cooling temperature or heat rejection temperature $T_{low}$. The heat rejection temperature may be provided by cooling water or air at ambient temperature. If it is desired that the heat rejection temperature $T_{low}$ be lower than an ambient temperature, a cooling device, such as a heat pump or thermoelectric element, may be applied to a cooling water to achieve a sub-ambient rejection temperature $T_{low}$. For such a cooling device, heat rejection occurs at an ambient or sub-ambient temperature.

The low-pressure hydrogen stream 110 is absorbed, adsorbed, or chemically bonded with or to the hydrogen carrier in the hydrogenation module 102 to form a hydrogen-rich stream 114. The hydrogen-rich stream may be liquid or liquid-like, depending on the chosen hydrogen carrier. The hydrogen storage capacity of the hydrogen carrier is determined in part by the pressure of the low-pressure hydrogen stream 110 and the heat rejection temperature $T_{low}$. The hydrogen-rich stream 114 is pumped or otherwise increased in pressure by pump 106 to form a pressurized hydrogen-rich stream 116. Pump 106 may be any type of mechanism that is suitable to pressurize the hydrogen-rich stream to a desired pressure, and may comprise a slurry pump, a piston pump, a vane pump, a "concrete-type" pump, or the like. The pressurized hydrogen-rich stream 116 is sent to the dehydrogenation module 104, where hydrogen is separated from the hydrogen carrier by a process of desorption or chemical bond release. The dehydrogenation process is endothermic and takes place at a higher temperature $T_{high}$ and pressure than the hydrogenation process. Therefore, a heat input 118 into the dehydrogenation module 104 is required. The thermal energy comprising the source of the heat input 118 may be from any known source, and in an aspect of the disclosure may be provided using a lower grade heat input (i.e., a lower exergy content energy stream), which may include solar thermal heat, waste heat, and the like. The magnitude of the higher temperature $T_{high}$ depends on the outlet pressure of the pump (which is the pressure of pressurized hydrogen-rich stream 116), the concentration of hydrogen in pressurized hydrogen-rich stream 116, and the concentration of the hydrogen carrier leaving the dehydrogenation module 104 in stream 124. The hydrogen separated from the hydrogen carrier leaves the dehydrogenation unit 104 as a high pressure hydrogen stream 122. A high-pressure hydrogen carrier stream 124 exits the dehydrogenation module 104. Stream 124 is reduced in pressure using throttling valve 108 to generate the hydrogen carrier 120. The hydrogen carrier once again enters the hydrogenation module 102 to continue the cyclic movement of the hydrogen carrier between the hydrogenation module and the dehydrogenation module.

Figure 2A:
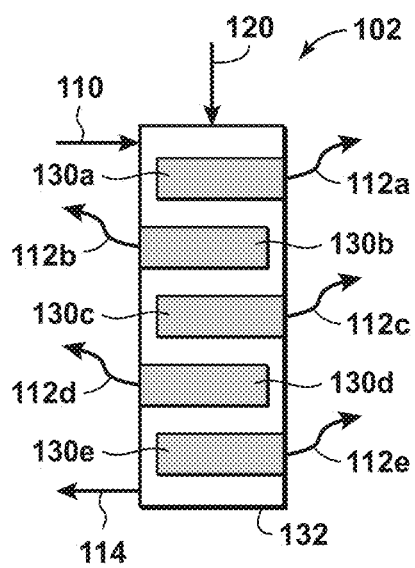
FIGS. 2A and 2B are side elevational cutaway views of a hydrogenation and a dehydrogenation module, respectively, showing temperature distribution and catalyst integration.
Figure 2B:
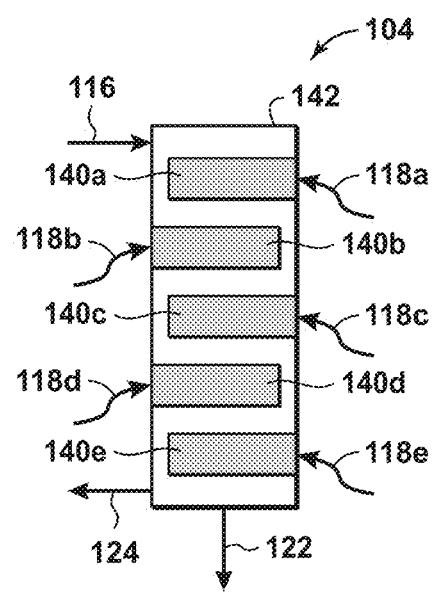

FIGS. 2A and 2B show internal components of the hydrogenation module 102 and dehydrogenation module 104, respectively, according to disclosed aspects. The hydrogenation module 102 includes a heat exchanger having plurality of heat exchanger elements 130a, 130b, 130c, 130d, 130e which are configured and arranged to remove heat generated during the hydrogenation process. The heat exchanger elements may be arranged within the hydrogenation module to maximize the removal of heat during the hydrogenation process. For example, the heat exchanger elements may be arranged to force the flow of low pressure hydrogen stream 110 and the hydrogen carrier in a serpentine flow path. If a catalyst is used in the hydrogenation process, the heat exchanger elements may be positioned within the catalyst bed 132. Alternatively or additionally, the catalyst may be integrated with the heat exchanger elements. As a non-limiting example, one or more heat exchanger elements may be comprised at least partially of the catalyst material. As another non-limiting example, one or more heat exchanger elements may be at least partially coated with a layer of catalyst material.

As shown in FIG. 2A, the heat exchanger elements may remove thermal energy (i.e., heat) in staged temperatures to provide a temperature gradient suitable for the thermodynamic property variation within the hydrogenation module. In other words, the heat removal 112a attributable to heat exchanger element 130a may be performed at a first temperature; the heat removal 112b attributable to heat exchanger element 130b may be performed at a second temperature; the heat removal 112c attributable to heat exchanger element 130c may be performed at a third temperature; the heat removal 112d attributable to heat exchanger element 130d may be performed at a fourth temperature; and the heat removal 112e attributable to heat exchanger element 130e may be performed at a fifth temperature, which is the temperature of the heat rejection 112 as discussed previously.

The dehydrogenation module 104 (FIG. 2B) includes a heat exchanger having a plurality of heat exchanger elements 140a, 140b, 140c, 140d, 140e which are configured and arranged to add heat to the dehydrogenation process. As with the hydrogenation module, the heat exchanger elements may be arranged within the dehydrogenation module so that a temperature gradient is applied to the dehydrogenation process to match varying properties of the hydrogen carrier as the hydrogen concentration therein is reduced. In this way, the efficiency of adding of thermal energy (i.e., heat) to the dehydrogenation process is maximized. If a catalyst is used in the dehydrogenation process, a catalyst bed 142 may be included in the dehydrogenation module, and/or the catalyst may be integrated with the heat exchanger elements. As shown in FIG. 2B, the heat exchanger elements may add thermal energy in staged temperatures to provide a temperature gradient suitable for the thermodynamic property variation within the dehydrogenation module. In other words, the heat addition 118a attributable to heat exchanger element 140a may be performed at a first temperature; the heat addition 118b attributable to heat exchanger element 140b may be performed at a second temperature; the heat addition 118c attributable to heat exchanger element 140c may be performed at a third temperature; the heat addition 118d attributable to heat exchanger element 140d may be performed at a fourth temperature; and the heat rejection 118e attributable to heat exchanger element 140e may be performed at a fifth temperature, which is the temperature of the heat input 118 as discussed above.

The hydrogenation and dehydrogenation modules 102, 104 shown in FIGS. 2A-2B may be designed to be highly compact using compact heat exchanger elements, such as plate-fin or printed circuit heat exchangers, provided such heat exchanger elements are conducive to be used with the selected hydrogen carrier and catalyst. Furthermore, while each of the hydrogenation and dehydrogenation modules are shown with five heat exchanger elements to exchange heat at staged temperatures, it is within the scope of the disclosed aspects to use different numbers of heat exchanger elements, and if desired to not exchange heat in the modules at staged temperatures.

Figure 3:
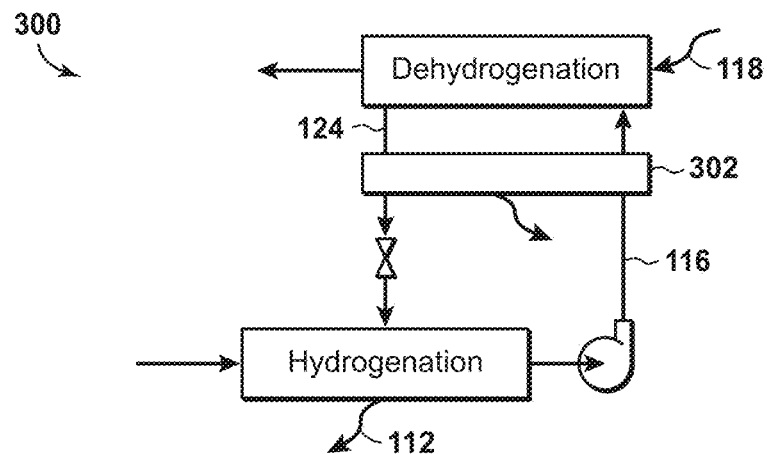
FIG. 3 is a schematic diagram of a thermal hydrogen compressor with a recuperator according to disclosed aspects.

FIG. 3 depicts a thermal hydrogen compression system 300 according to disclosed aspects. System 300 is similar to system 100 as described previously. System 300 includes a recuperative heat exchanger 302 that exchanges heat between a cooler pressurized hydrogen-rich stream 116 and a warmer high pressure hydrogen carrier stream 124. The recuperative heat exchanger 302 uses the heat of the high pressure hydrogen carrier stream to warm the pressurized hydrogen-rich stream 116, thereby reducing the magnitudes of both the heat rejection 112 and the heat input 118. Therefore, the use of the recuperative heat exchanger may increase the efficiency and/or performance of system 300 compared to the efficiency and/or performance of system 100.

Figure 4:
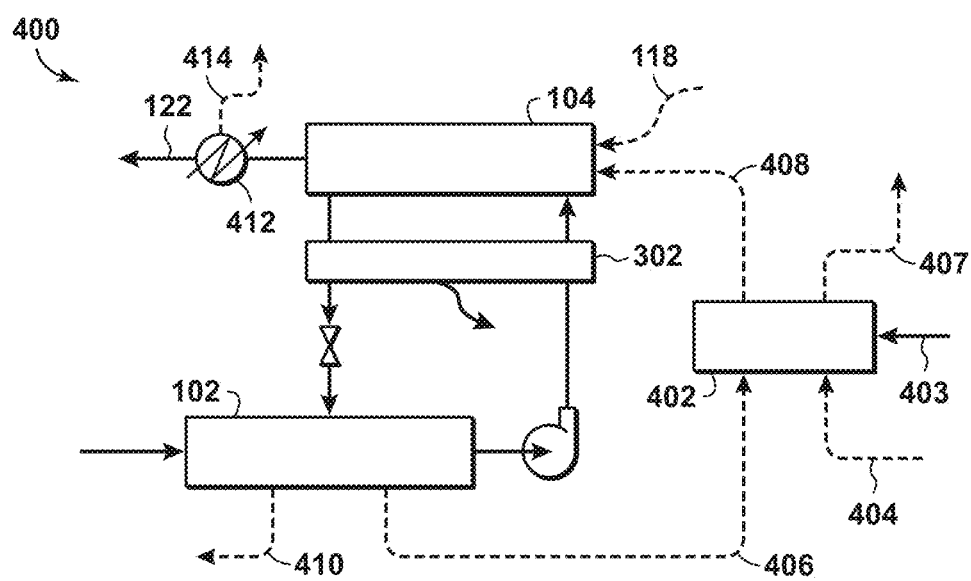
FIG. 4 is a schematic diagram of a thermal hydrogen compressor with a heat pump according to disclosed aspects.

FIG. 4 shows a thermal hydrogen compression system 400 according to disclosed aspects. System 400 is similar to systems 100 and 300 as described previously. System 400 includes a heat pump 402 that uses a work input 403 and an ambient heat source 404 to transform a low-temperature heat rejection 406 from hydrogenation module 102 into an ambient heat rejection 407 and a high-temperature heat rejection 408, the latter of which may then be used as an input to the dehydrogenation module 104. This enables part of the heat rejection from the hydrogenation module 102 to be at ambient temperature, as shown by ambient heat rejection 410. Furthermore, this can reduce the required heat input 118 into the dehydrogenation module 104. Lastly, an ambient cooler 412 may be positioned to cool the high pressure hydrogen stream 122 to ambient temperature and reject heat at ambient temperature, as shown at 414.

The temperature rise in heat pump 402, i.e., the temperature difference between low-temperature heat rejection 406 and high temperature heat rejection 408, determines the coefficient of performance of the heat pump. Heat pump integration may be configured in various ways: hydrogenation heat rejection may be used as a low temperature heat input (406) for the heat pump, enabling lower heat rejection temperature from the thermal hydrogen compressor. This heat input (406) may be augmented or replaced by heat input from the ambient (ambient heat stream 404). Likewise, heat rejection from the heat pump 402 may occur at temperatures that supplement heat input, shown as 408, to the dehydrogenation module 104 as well as at ambient temperatures, shown at 407. The heat pump heat input from the combined low-temperature heat rejection 406 and the ambient heat input 404 do not have to match the high-temperature heat rejection 408 heat flow, i.e., parallel heat input and rejection streams at ambient temperatures can be employed to vary an auxiliary heating/cooling ratio of thermal hydrogen compression system 400. The integration of a heat pump into system 400 enables stability control for compressed hydrogen production. For example, changes in ambient temperature can be compensated for by varying heat pump heat input 404.

Figure 5:
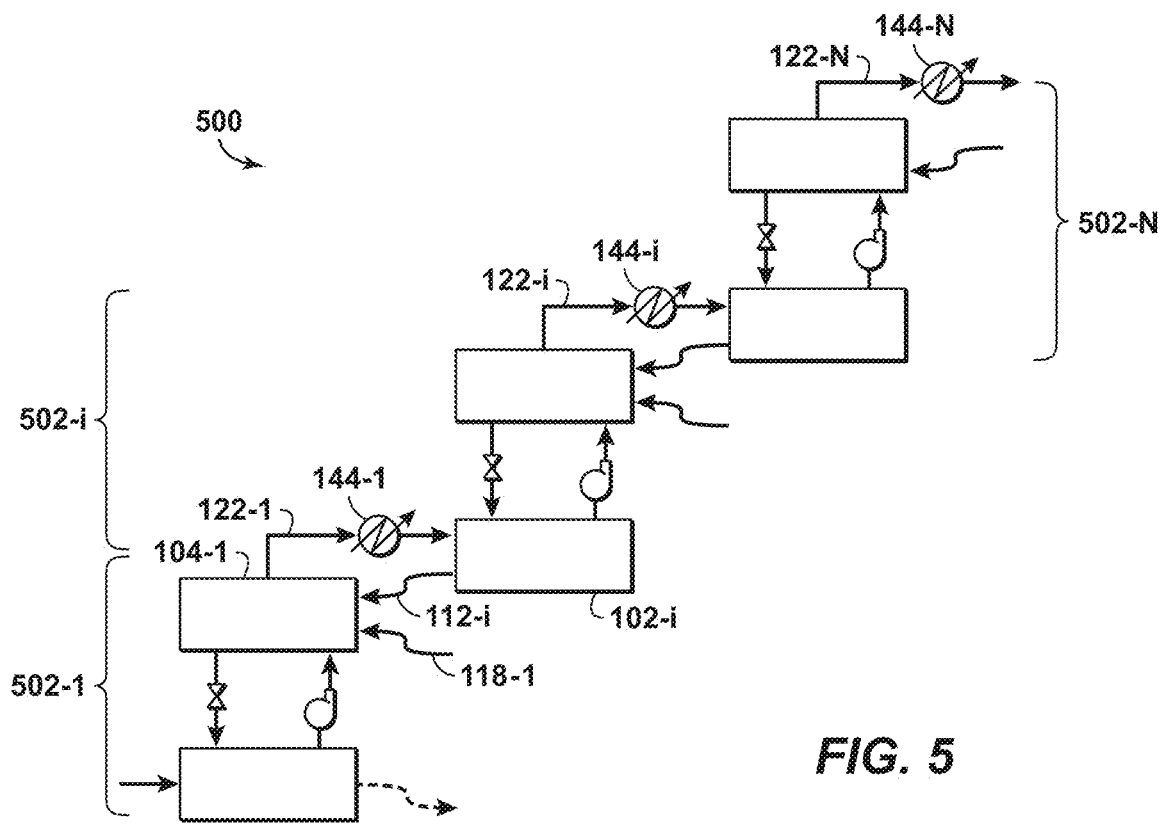
FIG. 5 is a schematic diagram of a multi-stage thermal hydrogen compressor according to disclosed aspects.

FIG. 5 depicts a multi-stage thermal hydrogen compression system 500 according to another aspect of the disclosure. System 500 includes a plurality of compression stages 502-1, 502-i, 502-N, where N is a positive integer greater than 1 and i represents all integers between 1 and N. Although only three compression stages are shown in FIG. 5 (i.e., N=3), it is understood that any number of compression stages could be included in system 500 (i.e., N>1). Each compression stage may be similarly constructed, and in FIG. 5 each compression stage includes the basic structure shown in FIG. 1; consequently, The output of each compression stage is a pressurized hydrogen-rich stream 122-1, 122-i, 122-N that is cooled using an intercooler 144-1, 144-i, 144-N. Each intercooler may use ambient air or water to cool the respective compressed hydrogen-rich stream. The pressure of each pressurized hydrogen-rich stream is increased through each compression stage such that the pressure of stream 122-N is highest of all of the pressurized hydrogen-rich streams. This means that each stage may operate at different pressures as well. Thus, the hydrogen carriers used in each stage may be adjusted or differed for the different pressure levels to match the thermodynamic properties (e.g., pressure and temperature) of each stage.

System 500 also employs the heat rejection of a hydrogenation module (e.g., heat rejection 112-*i* of hydrogenation module 102-*i*) as a heat input to a dehydrogenation module of a previous stage (e.g., dehydrogenation module 104-1). While an additional heat input 118-1 may still be required for the dehydrogenation module, the additional heat input may be sourced from a lower-grade energy as previously described.

Figure 6:
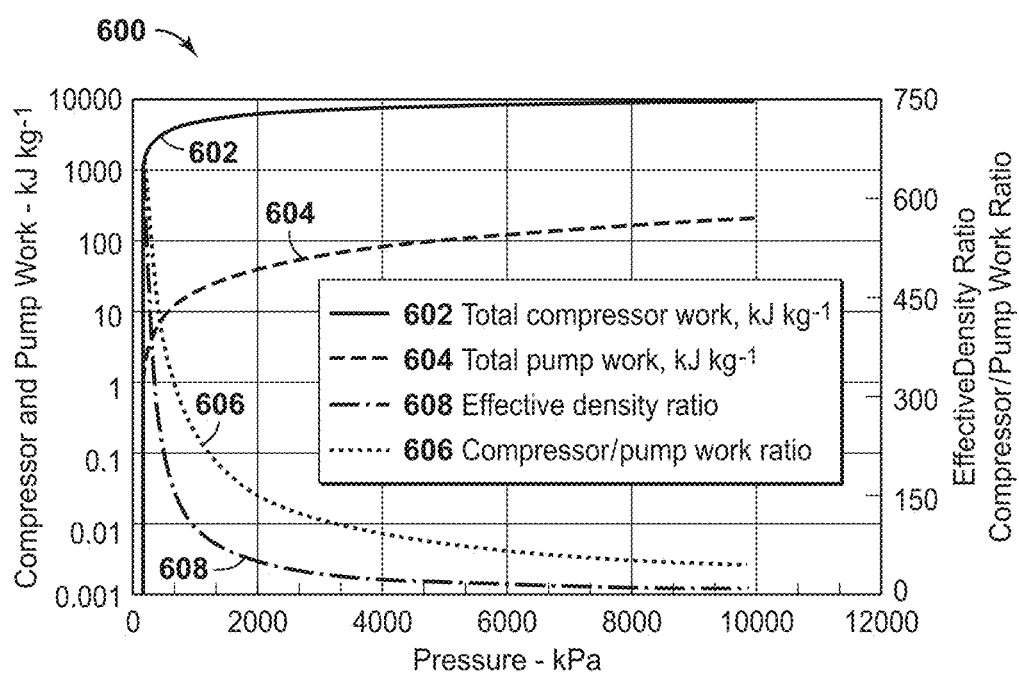
FIG. 6 is a graph showing the effect of pressure on compressor and pump work for vapor compression and thermal compression.

FIG. 6 is a graph 600 showing the effect of pressure rise (along the horizontal axis) for the overall compression system 100. Line 602 shows the work needed for a mechanical compressor to achieve a given pressure rise. Line 604 shows pump work for HC pump 106 in FIG. 1 for the same mass flow of hydrogen assuming a hydrogen loading of 8% by mass in the hydrogen carrier. Also shown is the effective density ratio 608 of hydrogen in the hydrogen carrier 120 (assumed to be 8%) to pure hydrogen vapor at that pressure. Lastly, the ratio of compressor work to pump work is shown by line 606. It can be seen that the highest mechanical work reduction opportunity (i.e., lowering the value of line 604 in comparison to line 602) is at lower pressures, e.g., less than 4,000 kPa.

Figure 7:
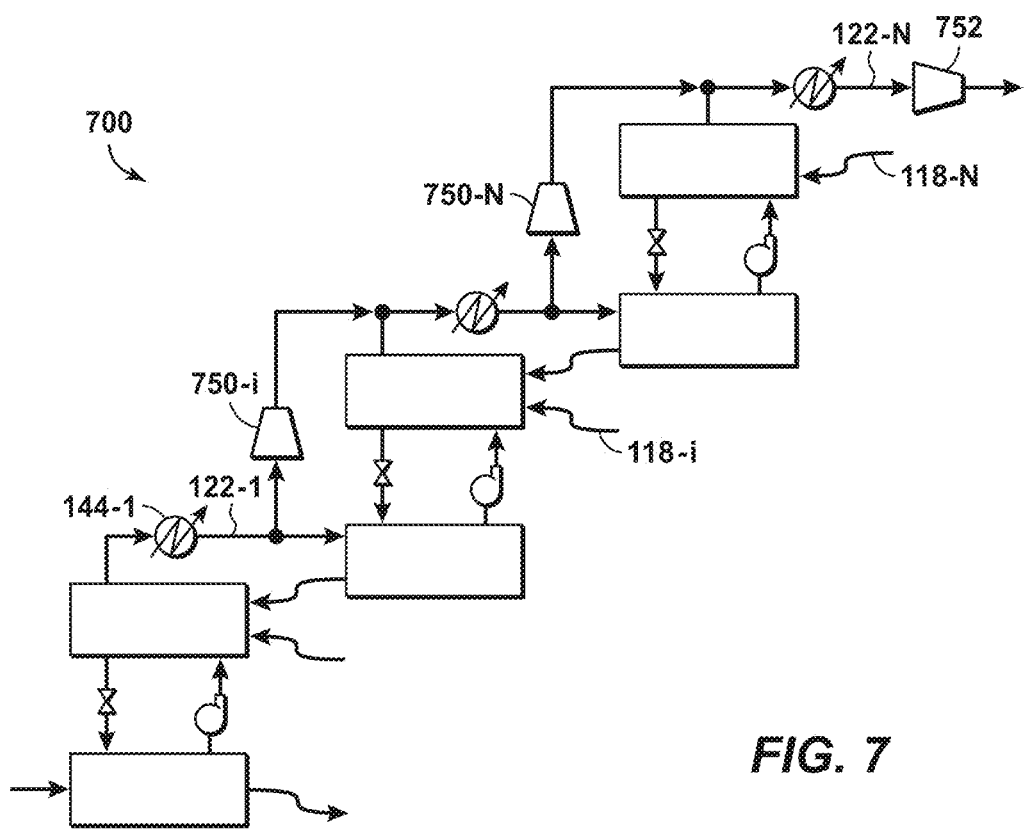
FIG. 7 is a schematic diagram of a multi-stage thermal hydrogen compressor with integrated mechanical compression according to disclosed aspects.

FIG. 7 is a multi-stage hydrogen compression system 700 according to further disclosed aspects. System 700 is substantially similar to system 500, with the addition of auxiliary compressors 750-*i*, 750-N that selectively and variably bypass a respective compression stage 502-*i*, 502-N while pressurizing and heating the high-pressure hydrogen stream (e.g., high-pressure hydrogen stream 122-1) to have substantially the same pressure and temperature of the high-pressure hydrogen gas stream (e.g., high-pressure hydrogen stream 122-*i*) exiting the compression stage being bypassed (e.g., compression stage 502-*i*). Each auxiliary compressor may be a variable-output mechanically powered compressor and preferably is located after the intercooler of the previous compression stage (e.g., intercooler 144-1). An output compressor 752 may be employed to compress the final high-pressure hydrogen stream 122-N. With the auxiliary compressors optionally variably bypassing the respective compression stage, the requirement for heat inputs 118-*i*, 118-N may be likewise variably reduced. Thus, system 700 may be controlled dynamically based on the availability of lower-grade power for the dehydrogenation module heat inputs. Additionally, varying the ratio of thermal-to-mechanical power may maximize or optimize efficiency and/or output.

Figure 8:
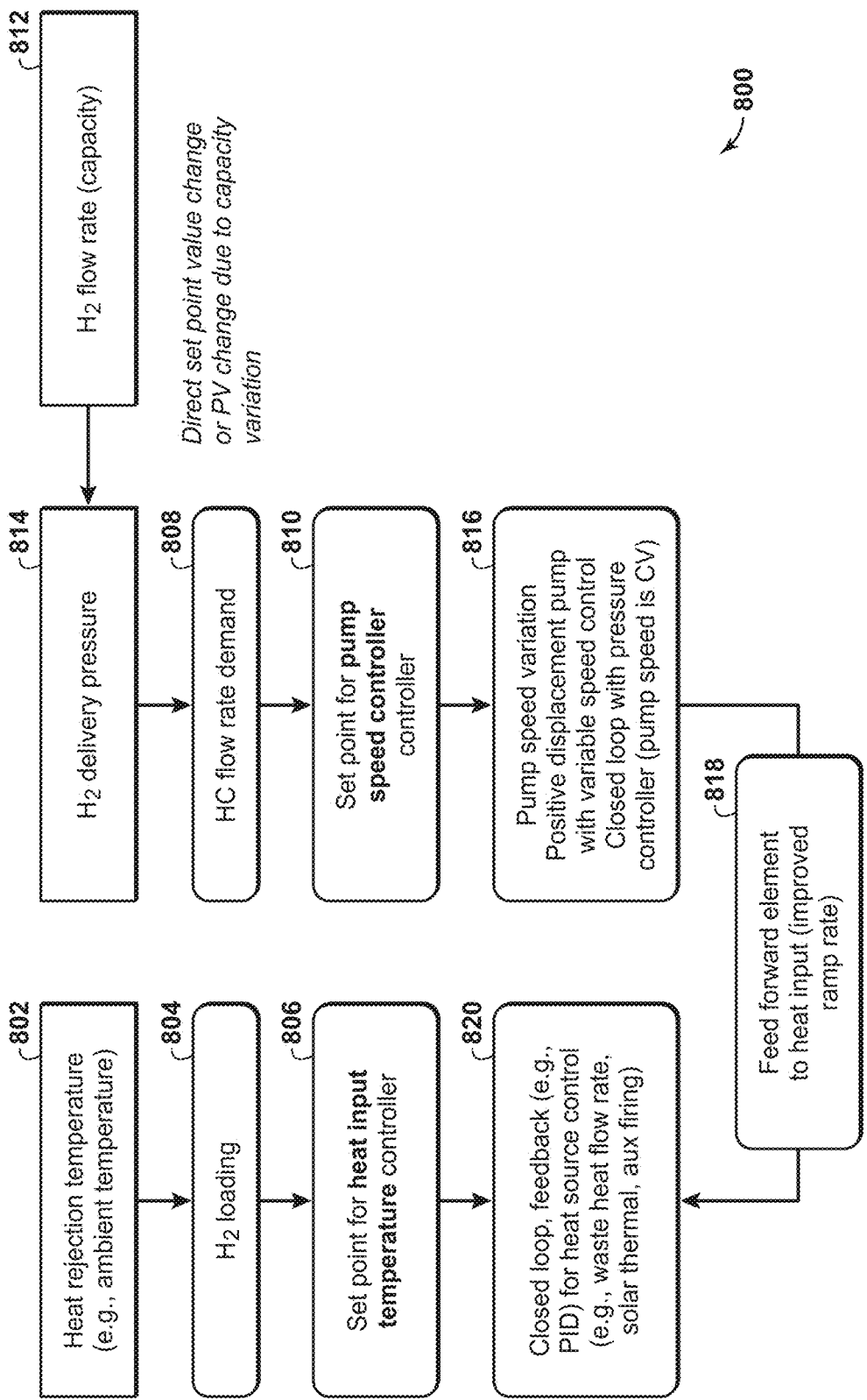
FIG. 8 is a flowchart of a method for control of a compression system according to disclosed aspects.

A system control method for the disclosed thermal hydrogen compression systems is shown in flowchart form in FIG. 8 at reference number 800. System control method 800 will be explained using the thermal hydrogen compression systems 100, 300 shown in FIGS. 1 and 3. The temperature of heat rejection 112 is an important independent input to the system control method and is shown at block 802. The temperature of heat rejection 112 typically is ambient temperature and determines hydrogen loading of the hydrogen carrier 120 (block 804) at a given pressure of the low pressure hydrogen feed 110. The hydrogen loading, in turn, determines the required temperature of the heat input 118 into the dehydrogenation module 104. At block 806, the temperature of the heat input 118 can be controlled, and a heat input set point established, based on the actual hydrogen loading of the hydrogen carrier (rich carrier loading), the pressure of the high pressure hydrogen stream (outlet pressure), and the amount of hydrogen in the hydrogen carrier in stream 120 (lean loading). The system capacity, or the amount of hydrogen processed by system 300, may be controlled by varying the flow rate of hydrogen carrier through the system (block 808) while maintaining the temperature of the heat input 118. The flow rate may be varied, for example, when pump 106 is a variable-output pump or a continuously-variable output pump such as a positive displacement pump. Varying the flow rate in this manner enables continuous turndown as well as partial load operation to very low flow rates, which may be less than ten percent of full capacity, so that variable demand may be easily met. The desired pump speed (block 810), in turn, is determined from (a) capacity demand, i.e., the flow rate of high-pressure hydrogen stream 122 (block 812), (b) the pressure of high-pressure hydrogen stream 122 (block 814), the temperature of heat input 118, and (c) the temperature of heat output 112. Preferably a model-based control, based at least on these variables, determines pump speed. Variation of the pump speed is accomplished (block 816) by controlling the speed of the variable-output pump in a closed-loop based on a set pressure of the high-pressure hydrogen stream 122). A feed-forward controller (block 818) uses the pump speed variation to help determine the necessary changes to heat input 118, which is controlled at block 820. This control system permits heat input sources, such as solar, thermal, waste heat from another process, or auxiliary firing processes, to be rapidly added or removed based upon the need of the system.

Although FIG. 8 depicts the pressure of high-pressure hydrogen stream 122 (block 814) as a function of capacity demand (block 812), it should be noted that capacity demand could be a function of the pressure of high-pressure hydrogen stream 122. In such a case, a drop in the pressure of high-pressure hydrogen stream 122 would require an increase in the flow rate of the high-pressure hydrogen stream to maintain the same hydrogen output.

Figure 9:
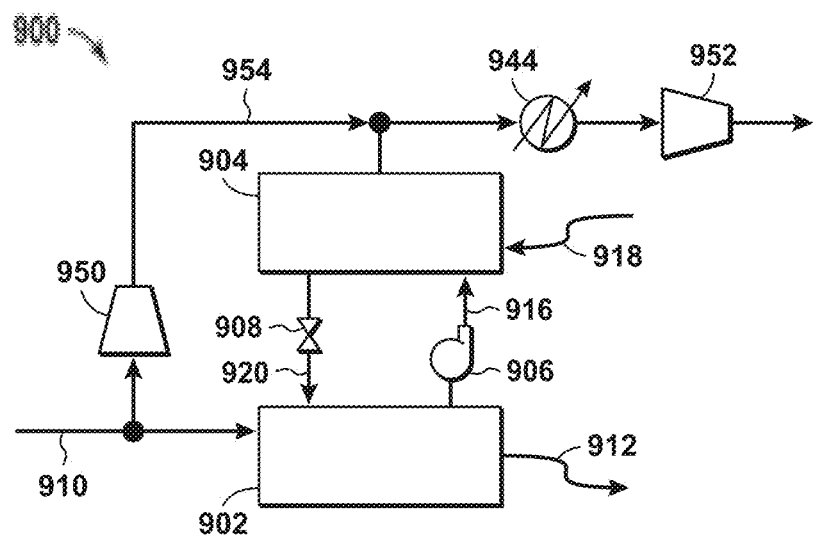
FIG. 9 is a schematic diagram of a thermal hydrogen compressor with integrated mechanical compression according to disclosed aspects.

The operation of system control method 800 may be optimized by manipulating a combination of mechanical and thermal compression. Such optimization may be accomplished using a thermal hydrogen compression system 900 as shown in FIG. 9. System 900 is similar in arrangement to one of the stages of system 700, and includes the following components: a hydrogenation module 902 and a dehydrogenation module 904; a pump 906 and a throttling valve 908; a hydrogen feed gas or input gas 910 at pressure $P_0$; a heat rejection 912 from the hydrogenation module at a low temperature $T_{low}$, which may be an ambient temperature; a pressurized hydrogen-rich stream 916; a heat input 918 to the dehydrogenation module at a high temperature $T_{high}$; a hydrogen carrier 920; an auxiliary compressor 950 that selectively and variably compresses hydrogen input gas to produce a pressurized hydrogen gas stream 954 at an intermediate pressure $P_1$; an intercooler 944; and an output compressor 952 that compresses the cooled and compressed hydrogen gas stream to produce an output hydrogen gas stream at an output pressure $P_2$. The function of each element, and the manner in which said elements are connected, have been discussed in connection with the previous Figures and will not be further discussed herein. As previously described, the addition of the intercooler 944 and the compressors 950, 952 provide an alternative means to pressurize and control the temperature of the hydrogen stream as it passes through system 900. This would further enable the use of intermittent low-quality heat sources for heat input 918, such as waste heat, off-gas combustion, solar, and thermal). As a lower heat output 912 temperature will reduce the efficiency of system and result in a lower intermediate pressure $P_1$ exiting the dehydrogenation module 904, system 900 provides the opportunity to optimize system output by balancing between the availability of sources for heat input 918 and the availability of mechanical energy to power the compressors 950, 952. For example, the temperature of heat input 918, and therefore intermediate pressure $P_1$, may be increased if a higher-grade heat source is available, such as concentrated solar thermal power, combustion heat or high temperature waste heat. The intermediate pressure $P_1$ may be lowered by increasing the compression provided by output compressor 952, thereby maintaining the output pressure $P_2$ even when the intermediate pressure is reduced.

The aspects disclosed herein have been described for use with systems using a hydrogen carrier that cycles through hydrogenation and dehydrogenation modules. Certain aspects of the disclosure may also be employed with other types of thermal compressors, such as fixed bed thermal compressors, in which the hydrogen carrier is solid and does not move between hydrogenation and dehydrogenation modules. Instead, at least two thermal compressor modules are employed. Each thermal compressor module cycles between hydrogenation and dehydrogenation. While one thermal compressor module is hydrogenating a hydrogen stream, the other thermal compressor module is dehydrogenating the hydrogen stream. In this manner, a constant stream of pressurized hydrogen can be output from the fixed bed thermal compressor. An example of a fixed bed thermal compressor may be seen in Norway Patent No. 330286, the disclosure of which is incorporated herein by reference in its entirety. The operation of such a fixed bed thermal compressor may be optimized by integrating it with a recuperator 302 as shown in FIG. 3, an external heat pump 402 as shown in FIG. 4, and/or parallel mechanical compression as shown in FIGS. 7 and 9.

Figure 10:
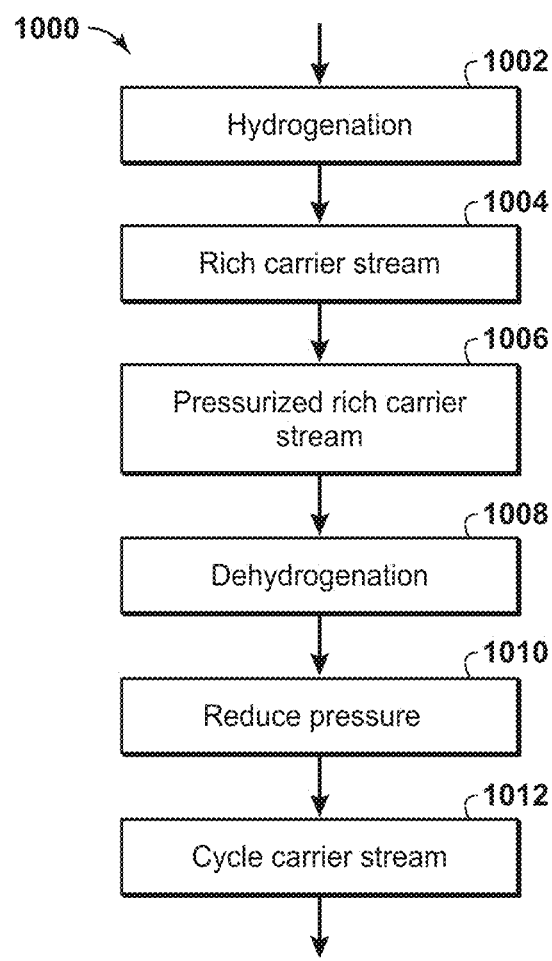
FIG. 10 is a flowchart showing a method of using a thermal hydrogen compressor according to disclosed aspects.

FIG. 10 illustrates a method 1000 of continuously compressing a hydrogen gas stream according to the disclosed aspects. At block 1002 the hydrogen gas stream is adsorbed or absorbed in a hydrogenation module, at a first pressure level, to a lean carrier stream through heat removal. At block 1004 heat output and a rich carrier stream containing absorbed or adsorbed hydrogen are produced. Using a pump, at block 1006 a pressure of the rich carrier stream is increased to produce a pressurized rich carrier stream. At block 1008 a pressurized hydrogen gas stream is separated from the pressurized rich carrier stream in a dehydrogenation module via an addition of heat, thereby producing a lean carrier stream. At block 1010 the pressure of the lean carrier stream is reduced before the lean carrier stream is returned to the hydrogenation module. At block 1012 the carrier stream is cycled continuously between the hydrogenation module and the dehydrogenation module.

An advantage of the disclosed aspects is that various amounts of heat from lower grade energy sources, such as waste heat, solar, and thermal sources, may be used to assist with the dehydrogenation process. This reduces the need to use higher grade energy sources, thereby reducing operating costs and environmental impact of emissions associated with production of high grade energy.

Another advantage is that the combination of a thermal compression system with an external heat pump lowers the temperature of the heat rejection from the hydrogenation module. Additionally, the heat rejection is integrated with the heat input, thereby making the system more efficient and reducing the need for additional heat input.

Still another advantage is that the disclosed multi-stage thermal compression systems make it possible to use different hydrogen carriers that are best suited for each temperature and pressure of the hydrogen at each stage.

Yet another advantage is that the parallel mechanical compressors enable the system optimize the power required for a desired pressurized hydrogen output.

Still another advantage is that the disclosed aspects provide simple, continuous control of a thermal hydrogen compression system based on just a few variables such as ambient temperature and the desired pressure and flow rate of the high-pressure hydrogen stream. No time-consuming switching of adsorption beds is required, as is suggested in known solutions.

While the foregoing is directed to aspects of the present disclosure, other and further aspects of the disclosure may be devised without departing from the basic scope thereof, and the scope thereof is determined by the claims that follow.

What is claimed is:

1. A method of continuously compressing a hydrogen gas stream, comprising:
   in a hydrogenation module, adsorbing or absorbing the hydrogen gas stream at a first pressure level to a lean carrier stream through heat removal, to thereby produce a heat output and a rich carrier stream containing absorbed or adsorbed hydrogen;
   using a pump, increasing a pressure of the rich carrier stream to produce a pressurized rich carrier stream;
   in a dehydrogenation module, separating, via an addition of heat, a pressurized hydrogen gas stream from the pressurized rich carrier stream, to thereby produce a lean carrier stream;
   reducing a pressure of the lean carrier stream before the lean carrier stream is returned to the hydrogenation module; and
   cycling the carrier stream is continuously between the hydrogenation module and the dehydrogenation module.

2. The method of claim 1, wherein the carrier comprises a composition that is substantially incompressible throughout a range of pressures used in the hydrogenation module and the dehydrogenation module.

3. The method of claim 1, further comprising:
   in a recuperative heat exchanger, exchanging heat between the lean carrier stream exiting the dehydrogenation module and the pressurized rich carrier stream exiting the pump.

4. The method of claim 1, further comprising:
   accepting at least a portion of a heat output of the hydrogenation module into a heat pump; and
   with a work input, providing a heat output from the heat pump, wherein the heat output is used, at least partially, in the dehydrogenation module.

5. The method of claim 4, further comprising:
   cooling the pressurized hydrogen gas stream in an ambient or sub-ambient cooler.

6. The method of claim 1, further comprising:
   determining a heat rejection temperature of the hydrogenation module;
   determining a hydrogen loading of the carrier stream using the heat rejection temperature;
   using the hydrogen loading and a pressure of the pressurized hydrogen gas stream, determining a required temperature of a heat input into the dehydrogenation module and setting a heat input set point for the dehydrogenation module; and
   controlling an amount of hydrogen processed by the thermal hydrogen compression system by varying a flow rate of the carrier stream while maintaining the required temperature of the heat input into the dehydrogenation module.

7. The method of claim 6, further comprising:
controlling a pump speed of the pump to vary the flow rate of the carrier stream.

8. The method of claim 7, further comprising:
determining the pump speed based on at least one of a desired flow rate of the pressurized hydrogen gas stream, a pressure of the pressurized hydrogen gas stream, and the heat rejection temperature.

9. The method of claim 8, further comprising:
using the pump speed to determine needed changes to the heat rejection temperature.

* * * * *